July 11, 1961

P. N. WINTERS 2,992,338

RADIO FREQUENCY SWITCH USING SERIES RESONANT CIRCUIT WITH SHUNT GATE AT VOLTAGE MAXIMUM NODE

Filed Aug. 22, 1956

PAUL N. WINTERS
INVENTOR

BY [signature]

ATTORNEY 2,992,338
Patented July 11, 1961

2,992,338

RADIO FREQUENCY SWITCH USING SERIES RESONANT CIRCUIT WITH SHUNT GATE AT VOLTAGE MAXIMUM NODE

Paul N. Winters, Hawthorne, Calif., assignor to Hughes Aircraft Company, Culver City, Calif., a corporation of Delaware Filed Aug. 22, 1956, Ser. No. 605,666
4 Claims. (Cl. 307—88.5)

This invention relates to a switching circuit for continuous radio-frequency signals and more particularly to an electronically gated filter network for switching radio-frequency signals off and on.

Various methods and arrangements have been employed to switch or turn a continuous radio-frequency signal on and off. One of these methods involves electronically gating the radio-frequency signal through the use of vacuum tubes as gating elements. As is well known, vacuum tubes require special voltages, careful shielding, an appreciable warm-up time and the associated circuitry is generally complex and bulky. Resistive networks have been employed and are not considered suitable since they attenuate the signal too much. Accordingly, it is desirable to provide a simpler and more economical method of electronically gating a continuous radio-frequency signal with a minimum amount of attenuation.

It has been found that a more economical arrangement for gating a continuous radio-frequency signal results through the employment of a filter network for passing the radio-frequency signal and providing a variable impedance device in circuit relationship therewith for rendering the filter network ineffective to pass the signal to thereby effectively switch the signal off and on. The present invention deals with the problem along this form of approach, but eliminates the need for any vacuum tube circuits and the complexity associated therewith.

It is therefore a general object of this invention to provide an improved apparatus for switching a continuous radio-frequency signal on and off without resorting to vacuum tube circuits.

It is another object of this invention to provide an improved apparatus for turning a continuous radio-frequency signal off and on by passing the signal through a filter network capable of being rendered ineffective to pass the signal.

It is a further object of this invention to provide an improved apparatus of the aforementioned character wherein the signal passing through the network is electronically gated.

It is yet another object of this invention to provide a filter network for passing a radio-frequency signal and gating the network through the use of a semiconductor device.

Further and additional objects and advantages will become apparent hereinafter during the detailed description of the embodiments of the invention which are to follow and which are illustrated in the accompanying drawing wherein.

Generally, the invention contemplates the turning on and off of a continuous radio-frequency signal or wave provided by a radio-frequency oscillator 10 and which signal is coupled by means of a filter network 12 to a utilization device 14.

Figures 1, 3:
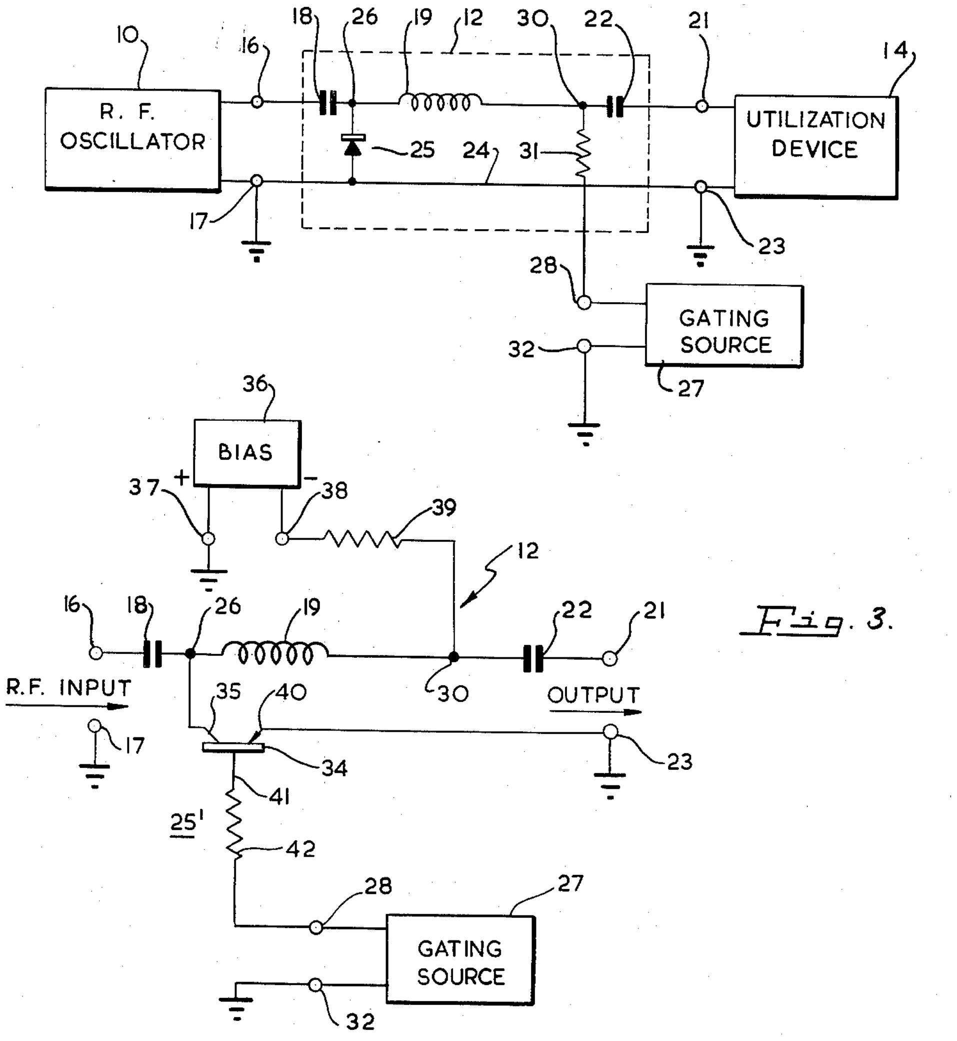
FIG. 1 is a partial block and circuit diagram of a radio-frequency arrangement embodying the invention.
FIG. 3 is a circuit diagram of a modification of the invention shown in FIG. 1.

The radio-frequency oscillator 10 is represented in block form in FIG. 1 and may be any type of oscillator known in the art. The radio-frequency signal or wave provided by the oscillator 10 is coupled to the network 12 by means of the output terminals 16 and 17, the latter of which may be grounded. The network 12 is arranged to pass the radio-frequency signal received therein substantially without attenuation to the utilization device 14.

The network 12 utilized in this particular embodiment is a series resonant circuit arranged to pass the signal frequency of the oscillator 10. The electrical characteristics of a series resonant circuit are well known and it should suffice for the purpose of this invention to note that a series resonant circuit presents a low impedance path to the resonant radio-frequency of the signal or wave. The series resonant circuit comprises a capacitor 18 and inductor 19 connected in series with the terminal 16. The capacitor 18 has its free end connected to the terminal 16, while the free end of the inductor 19 is connected to a terminal 21 of the utilization device 14 through a blocking capacitor 22. The remaining terminal 23 of the utilization device 14 may also be connected to ground or in common with the terminal 17 of oscillator 10 by means of a lead 24.

Figure 2:
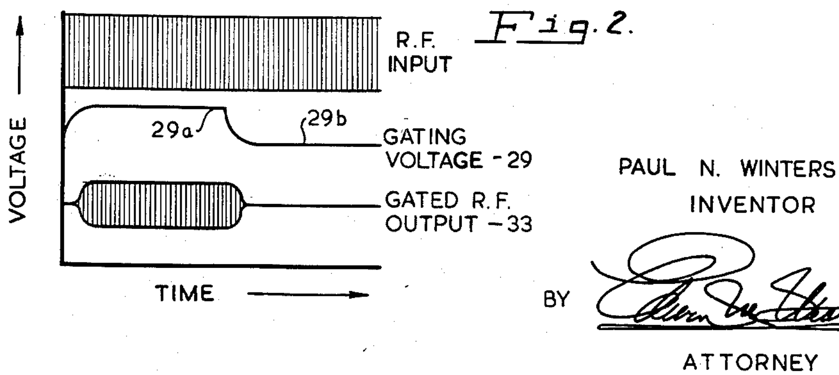
FIG. 2 is a graph representing typical waveforms appearing in various portions of the circuit of FIG. 1.

A switching or variable impedance device 25 such as a diode is connected between ground and the common junction 26 of the capacitor 18 and the inductor 19. The diode is arranged with the cathode thereof connected to the junction 26 and its associated anode to the lead 24, as shown. A gating voltage 29 having characteristics similar to the voltage waveform shown in FIG. 2 may be provided by a source 27, and which voltage is also impressed on the network 12. The terminal 28 of the source 27 is connected to the common junction 30 intermediate the inductor 19 and the capacitor 22 through a resistor 31 while the remaining terminal 32 thereof is connected to ground. During the existence of a gating voltage similar to one identified by the reference character 29$^a$ the voltage 29 developed by source 27 is arranged to back-bias the device 25 to prevent any conduction thereof and thereby any rectification of the signal passing through the network 12. Accordingly, the amplitude of the signal in passing through the filter network 12 remains substantially unaltered. It should be noted, however, that where a semiconductor diode is employed the amplitude of the input signal is limited so that it will fall above the Zener region thereof.

The radio-frequency signal may be cut off, in this instance, by changing the gating voltage 29 to a negative voltage as identified by the reference character 29$^b$, to the device 25 to front-bias it and thereby render it conductive. It will be readily appreciated that the biasing of the diode in this manner will provide a direct path to ground for a signal or wave applied to the network 12 and prevent the signal or wave from being coupled to the utilization device 14. The radio-frequency signal will remain turned off for substantially the complete time interval that the diode remains front-biased, that is the time duration of the portion 29$^b$ of the gating voltage, as may be better appreciated from viewing the gated output signal 33 shown in FIG. 2.

The network 12 is arranged to provide the correct characteristic impedance for coupling into both the oscillator 10 and the utilization device 14. It also should be noted that this particular arrangement provides essentially a pair of shunt impedance paths for the radio-frequency signal. The filter provides the lower impedance signal path for the signal during the interval the device 25 is back-biased, while the device 25 provides a low impedance signal path when it is front-biased. This arrangement has the further advantage that during the interval the device 25 is front-biased it effectively detunes the resonant circuit whereby it presents a very high impedance to the radio-frequency signal and also results in a more effective gating action. Also, during this interval the radio-frequency signal is isolated from the utilization device 14.

Although the network of FIG. 1 was described in terms of a resonance phenomena, the resonant circuit is used merely as a convenient means to step up the impedance of the network and it should be understood that it is not necessary that the network be a resonant circuit, but may be any filter network of inductors and capacitors that may have high-pass, low-pass or band-pass characteristics. As in the case of a resonant circuit, the filter will be designed to present a low impedance path or have a characteristic impedance to the desired frequency band to allow the passage of the signals therethrough. Again, when the device 25 is conductive to short out a portion of the filter network, the filter will now present a very high impedance different from the characteristic impedance to that same frequency band so as to be "detuned" and will be bypassed through the device 25. Accordingly, it is now apparent that the use of a filter network introduces a minimum amount of attenuation while providing a simple gating circuit.

Now referring to FIG. 3, a modification of the filter network 12 will be described. The embodiment shown in FIG. 3 is substantially similar to the one shown in FIG. 1 except that in this instance the device 25 takes the form of a transistor switch.

The filter network 12 comprises the series resonant circuit including the capacitor 18, the inductor 19 and the blocking capacitor 22. The variable impedance device 25' employed is a commercially available transistor, the semiconductor body of which is identified by the reference character 34. The collector electrode 35 of the transistor is connected to the circuit junction 26 and is biased by the voltage developed by a source 36. The bias source 36 has its positive terminal 37 connected to ground and its negative terminal 38 connected to the junction 30 by means of an impedance or resistor 39. The emitter electrode 40 is connected to the terminal 23 and may be grounded as shown. The base electrode 41 is connected to the source of gating voltage 27 through a base impedance or resistor 42 by means of a direct connection to the free end of the impedance.

The aforementioned impedances and voltages applied to the device 25' are proportioned so that during the intervals the gating voltage 29 has a relative amplitude as identified by the reference character 29[a], the device will present a high impedance to the signal or wave impressed on the network 12. This arrangement allows the impressed signal or wave to be transmitted through the network 12 and maintain the device 25 in a nonconductive condition. When the gating voltage 29 goes through the negative excursions as identified by the reference character 29[b], the device 25 will be arranged to conduct and thereby present a low impedance path to ground to any signal or wave impressed into the network 12. The path to ground is through the emitter electrode 40 of the device 25. This action again results in cutting off the passage of any signal or wave through the network 12.

The operation of the device 25' is such as to normally present a high impedance path to the radio-frequency signal in the absence of a gating voltage from the source 27 to cause the transistor to conduct. Accordingly, the signal will pass through the network 12. When a negative gating voltage is applied to the base electrode 41 by the source 27, the transistor will be triggered into conduction to thereby provide a low impedance path for the radio-frequency signal. This action again results in cutting off the passage of the radio-frequency signal through the filter 12.

Although the filter network has been described in connection with a single filter section, it should be understood that the principle of this invention applies to any type of L-C filter network and any number of filter sections, the number and type of filter sections being a design factor dictated by the associated equipment. The above-described circuits have been successfully operated to turn on and off the radio-frequency signals up to 100 megacycles in approximately one microsecond. The frequency limitation of the device appears to be only limited by the physical circuit elements.

Also, the concept of this arrangement applies to a filter network having a variable impedance device in series with the signal path, along with an additional variable impedance device providing a shunt path for the signal. The impedances of these devices are then controlled to be alternately high and low to thereby provide the desired switching action. In the combination of devices described it has been found that either one of the devices may be omitted and satisfactory operation obtained. However, the use of merely a series impedance device such as a semiconductor diode limits the upper limit of the frequency of the signal or wave impressed on the associated network.

It is therefore apparent that the invention described hereinabove has advanced the state of the art by providing a new and improved apparatus for turning a radio-frequency signal on and off by electronically controlling a filter network therefor, eliminating any complex vacuum tube circuits. The network is arranged with a semiconductor device to have a low impedance for passing the desired radio-frequency signal or wave and which semiconductor is maintained nonconductive during these intervals. The network is rendered ineffective to pass a signal impressed thereon by changing the gating voltage to allow the semiconductor device to conduct. The simplicity in changing the gating voltage allows the radio-frequency signal to be switched on and off at high speeds.

Having thus described my invention, what is claimed is:

1. Apparatus for selectively coupling an oscillator to a utilization device, the output of said oscillator being of a predetermined frequency, said apparatus comprising a capacitor and an inductor connected in series between said oscillator and said utilization device, said capacitor and said inductor being series resonant at said predetermined frequency, a unidirectionally conducting device connected from intermediate the common junction of said capacitor and said inductor to a reference terminal maintained at a substantially fixed potential, said unidirectionally conducting device normally presenting a substantially infinite impedance to said common junction thereby to couple said oscillator to said utilization device; and electrical signal responsive means coupled to said unidirectionally conducting device for rendering said unidirectionally conducting device conductive thereby to decouple said oscillator from said utilization device in response to said electrical signal.

2. A network for gating an electrical signal of a predetermined frequency, said network comprising: first and second input terminals and first and second output terminals, said second input and said second output terminals being connected to a reference terminal maintained at ground potential; a capacitor and an inductor connected in series between said first input terminal and said first output terminal, said capacitor and said inductor being series resonant at said predetermined frequency; a semiconductor device having at least first and second connecting leads, said first lead being connected to the common junction between said capacitor and said inducor and said second lead being returned to said reference terminal; means connected from said reference terminal to the extremity of said inductor opposite said common junction for normally biasing said semiconductor device in a manner to present a high shunt impedance to said common junction; and electrical signal responsive means connected from said semiconductor device to said reference terminal for selectively rendering said semiconductor device conductive thereby to present a low shunt impedance to said common junction.

3. The network for gating an electrical signal of a predetermined frequency as defined in claim 2, wherein said semiconductor device is a transistor having a collector lead which corresponds to said first lead, an emitter lead which corresponds to said second lead, and a base lead which is connected to said electrical signal responsive means.

4. The network for gating an electrical signal of a predetermined frequency as defined in claim 1, wherein said unidirectionally conducting device is a diode.

References Cited in the file of this patent

UNITED STATES PATENTS

| | | |
|---|---|---|
| 1,835,099 | Stone | Dec. 8, 1931 |
| 2,157,312 | Wright | May 9, 1939 |
| 2,594,449 | Kircher | Apr. 29, 1952 |
| 2,597,796 | Hindall | May 20, 1952 |
| 2,601,096 | Creamer | June 17, 1952 |
| 2,654,834 | Zarky | Oct. 6, 1953 |
| 2,663,800 | Herzog | Dec. 22, 1953 |
| 2,666,901 | Lynn | Jan. 19, 1954 |